United States Patent [19]

Colardelle et al.

[11] 3,855,430

[45] Dec. 17, 1974

[54] ELECTRONIC HYBRID CIRCUIT FOR TWO-WIRE TO FOUR-WIRE INTERCONNECTION

[75] Inventors: Joel Serge Colardelle, Cretell; Pierre Girard, Paris; Paul Henri Lerouge, Maurepas, all of France

[73] Assignee: International Standard Electric Corporation, New York, N.Y.

[22] Filed: Nov. 15, 1972

[21] Appl. No.: 306,595

[30] Foreign Application Priority Data

Nov. 19, 1971 France .............................. 71.41460

[52] U.S. Cl. .......................................... 179/170 NC

[51] Int. Cl. .............................................. H04b 1/58

[58] Field of Search........ 179/16 EC, 170 R, 170 O, 179/170 NC, 170.2, 170.6; 333/11, 25

[56] References Cited

UNITED STATES PATENTS

| | | | |
|---|---|---|---|
| 3,530,260 | 9/1970 | Gaunt, Jr. | 179/170 NC |
| 3,586,881 | 6/1971 | Gaunt, Jr. | 179/170 NC |
| 3,700,831 | 10/1972 | Aagaard et al. | 179/170 NC |
| 3,711,660 | 1/1973 | Cherry | 179/170 NC |

FOREIGN PATENTS OR APPLICATIONS

| | | | |
|---|---|---|---|
| 1,124,351 | 8/1968 | Great Britain | 179/170 NC |

*Primary Examiner*—William C. Cooper
*Assistant Examiner*—Randall P. Myers
*Attorney, Agent, or Firm*—D. P. Warner; J. B. Raden

[57] ABSTRACT

An electronic hybrid circuit is disclosed for two-wire to four-wire conversion. Two integrated circuit differential amplifiers are used to provide transmission in each direction. Interconnections are possible between the amplifiers to insure cancellation of reflections from signals traveling in opposite directions.

8 Claims, 3 Drawing Figures

ELECTRONIC HYBRID CIRCUIT FOR TWO-WIRE TO FOUR-WIRE INTERCONNECTION

The present invention concerns a full electronic hybrid circuit for two wire to four-wire conversion in telephone systems and, more generally, in data switching systems.

This circuit is, more particularly, used for coupling two-wire subscriber lines (balanced transmission) to a four-wire switching stage (unbalanced transmission) equipped with electronic crosspoints whose resistance is not negligible. Such a switching stage may, for instance, be equipped with MOS transistor switching crosspoints such as those described in the French Patent No. 1,555,813 and the fourth French Patent of Addition thereto No. 6,944,164.

Elimination of crosspoint resistance effect is provided by using, as variable data support, the current whose amplitude is independant of the value of the resistance inserted in the path connecting two subscriber lines through the switching network. An electronic hybrid circuit, operating in accordance with that principle and including discrete components, has been described in the French Patent application No. 7,137,599.

The present invention relates to a hybrid circuit designed for the same utilization, but fully equipped with operational amplifiers made of integrated circuits which considerably simplifies its design.

Therefore, a purpose of the present invention is to provide a two-wire-four-wire hybrid circuit which is fully electronic and of which active elements are solely formed by integrated circuit operational amplifiers.

According to a feature of this invention, there is provided a hybrid circuit comprising a pair of input terminals A, B associated to the two-wire line and a pair of output terminals C, D associated to the four-wire side, said circuit including first means for transmitting data signals toward direction N (from output to input), said first means comprising two operational amplifiers so connected that unbalanced data signals applied to terminal D are converted into balanced signals appearing across terminals A, B, second means for transmitting data signals toward direction M (from input to output), said second means comprising a difference operational amplifier connected in series and converting input balanced signals into unbalanced signals and a current generator whose output is connected to the terminal C, and third means for avoiding signal reflection from direction N to direction M.

Figure 1:
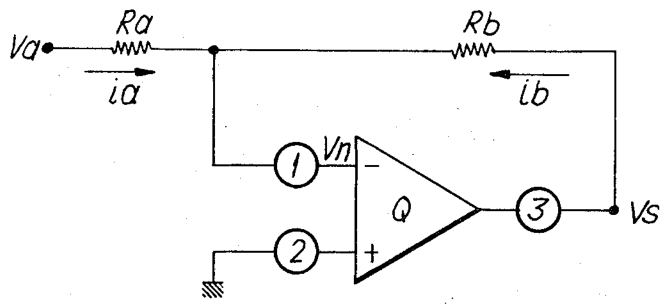
Figure 2:
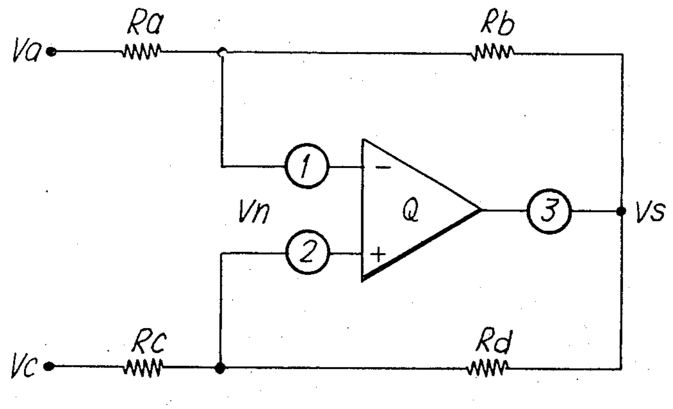
Figure 3:
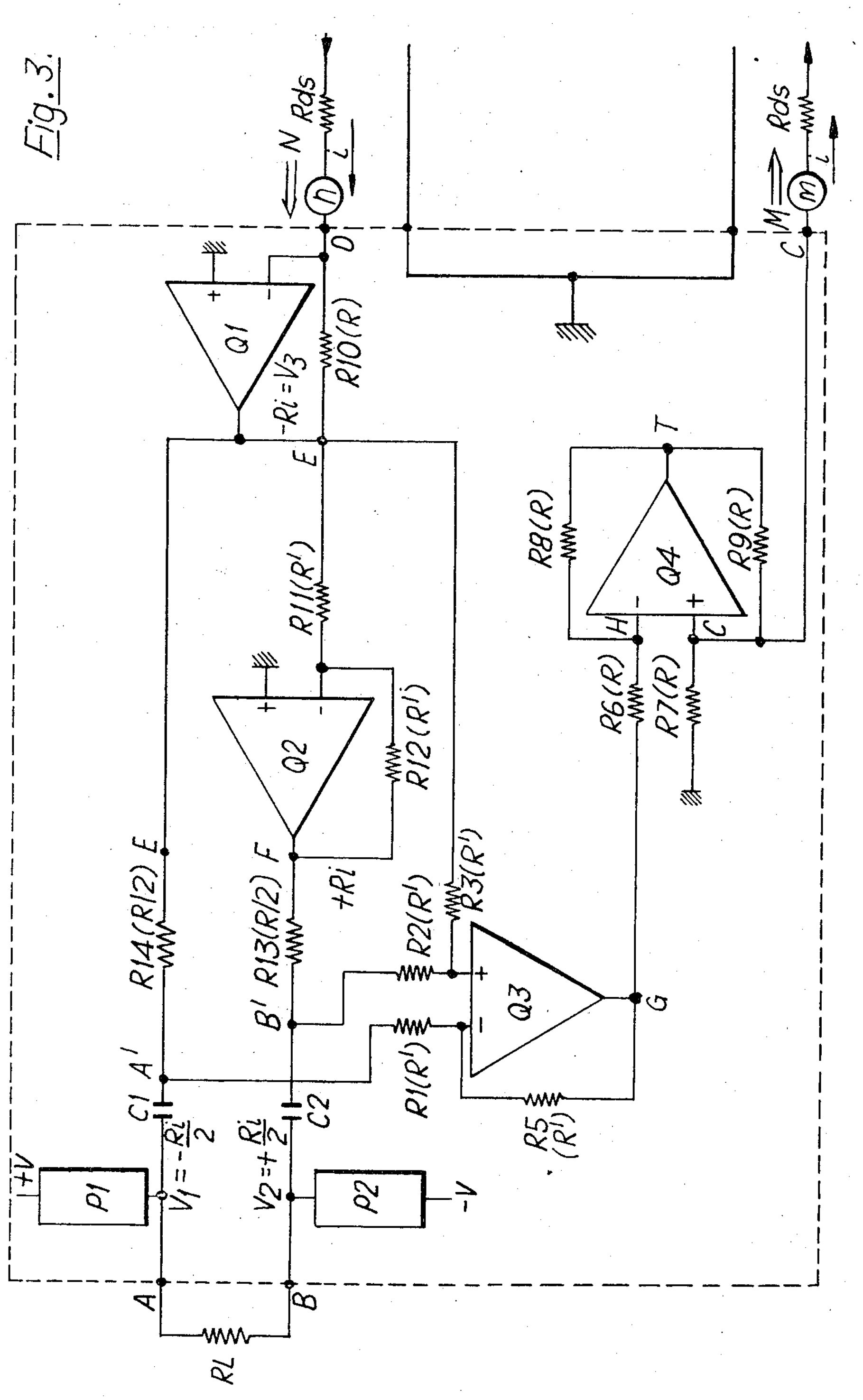

Other purposes, features and advantages of the present invention will appear more clearly from the following description of an embodiment, said description being made in conjunction with the accompanying drawings, wherein:

The FIG. 1 illustrates a voltage amplifier circuit using a differential operational amplifier;

The FIG. 2 illustrates a similar circuit comprising, in addition, a positive feedback loop, and The FIG. 3 illustrates the detailed hybrid circuit according to the invention.

Before describing the hybrid circuit, it will be first recalled in conjunction with the FIGS. 1 and 2 the main characteristics of a differential operational amplifier having a very high open-loop gain.

The FIG. 1 shows a voltage amplifier comprising:

The operational amplifier Q with input 1 (inverter input), input 2 (non-inverter input) and output 3;

A negative feedback network with resistors R$a$, R$b$.

An input voltage V$a$ is applied to resistor Ra and the circuit delivers an output voltage V$s$. In the following, Vn designates the potential on input 1 of the amplifier.

As the input impedance of amplifier Q is very high (generally higher than several kilohms), typically no current enters it. Thus $ia + 1b = 0$, and it is possible to write: $Va\text{-}Vn/Ra = Vn\text{-}Vs/Rb$ .

Moreover, as the open-loop gain Bo is very high, it is possible to consider that $Vn \approx 0$, i.e., that input 1 is a virtual ground.

Then the preceding equation becomes:

$Va/Ra = - Vs/Rb$ , i.e., in absolute value: $Bc = Vs/Va = Rb/Ra$ .

The closed-loop gain Bc of the circuit is then equal to the ratio of resistances R$b$ and R$a$.

The FIG. 2 shows a similar circuit comprising a negative feedback loop (R$a$, R$b$) and a positive feedback loop (R$c$, R$d$). In that case, inputs 1 and 2 are typically at the same potential V, but this one is different from zero.

Currents are determined as in the preceding case as it will appear in the course of the description.

The FIG. 3 is a schematic diagram of the hybrid circuit LC, according to this invention, which makes it possible to couple a balanced line of impedance RL, connected to terminals A, B, to an unbalanced line or to a four-wire switching network connected to terminals C, D.

On the four-wire side, resistors Rds are shown which symbolize the resistance of MOS transistors used as crosspoints. Double arrows M and N indicate signal transmission direction, on the unbalanced side.

The balanced line, connected to terminals A and B, is supplied under a potential difference of 2V through power-supply dipoles P1 and P2. These power-supply dipoles, which have been previously described in the French Patent application No. 7,125,013, provide the following functions:

Isolation of the different lines with respect to power-supply sources;

Protection against short-circuits on the line.

This line power-supply is, in DC current, completely insulated from other elements of circuit LC by capacitors C1 and C2.

The other elements of circuit LC are:

The differential operational amplifiers Q1, Q2, Q3 and Q4 which are supplied in a well known manner with two equal voltages of opposite polarities. Corresding power-supply sources are not shown in the FIG. 3;

The resistors R1 to R14 whose values are shown in brackets. It appears that these values are derived from two basic values R and R', which are so chosen that $R' >> R$, for instance, $R' = 10$ kilohms and $R = 600$ ohms. The nominal value of RL is 600 ohms.

The circuit LC is provided for the following functions:

Transmission of data from the line connected to terminals A, B toward output C (transmission direction M), while avoiding any crosstalk in the wire n connected to the terminal D;

Transmission of data from wire n to terminals A, B, while avoiding any cross-talk in the wire *m* connected to terminal C.

It will be noted that those data are represented by a voltage modulation at the line side and a current modulation on wires *m* and *n*.

Operation of circuit LC will now be described for each transmission direction without taking into account the interaction with the other transmission direction.

1. TRANSMISSION DIRECTION N

Transmission, in direction N, utilizes amplifiers Q1 and Q2.

As previously mentioned, the data entering in the circuit LC is a current *i* which is applied to the inverter input of amplifier Q1. As amplifier Q1 absorbs no current, current flows through resistor R10 and the output voltage, at point E, is $V3 = -Ri$.

Voltage V3 is applied, on the one hand, to terminal A' through resistor R14 and, on the other hand, to amplifier Q2 operating as a voltage amplifier. The gain of that voltage amplifier is determined by the ratio of resistors R11 and R12 and is equal to unity so that output voltage at point F is $V3 = Ri$.

Thus it appears that data (current *i*) applied to input D is delivered between terminals E and F in the form of two equal voltages in phase opposition and of absolute value Ri. Resistors R13, R14 being equal to R/2 and resistor RL being equal to its nominal value R, it appears that terminals A and B are symmetrically supplied with two voltages $V1 = -Ri/2$ (terminal A) and $V2 = +Ri/2$ (terminal B). Data transmitted to the line is thus a voltage of value $$VL1 = Ri \quad (1).$$

2. TRANSMISSION DIRECTION M

Transmission, in direction M, utilizes the operational amplifiers Q3 and Q4.

The data entering in the circuit LC is a balanced voltage VL2 received on the line of impedance RL. That voltage is applied, on the one hand, to inputs A' and B' of the amplifier circuit comprising components R1, R2, R3, R5 and Q3 and, on the other hand, to resistors R14 and R13 whose terminals E and F are at the ground potential when no signal is received in direction N. Thus the impedance presented by the circuit LC between points A and B has a value R and its middle point is grounded. As a result, inputs A' and B' of the amplifier circuit receive equal voltages in phase opposition and of absolute value VL2/2, called −V1 and +V2.

All the resistors of the amplifier circuit including the amplifier Q3 have the same value R' so that addition of currents on the non-inverting input of the amplifier Q3 corresponds to a voltage addition and we can write:

$$VG = V2 + V3 - V1 \quad (2);$$

V1, V2, V3 being respectively the voltages at points A', B', E.

We will suppose that for describing the operation in direction M, point E is grounded, i.e., $V3 = 0$.

Moreover, it has been hereabove mentioned that V1 and V2 were equal and in phase opposition so that voltage at point G is:

$$VG = VL2 \quad (3).$$

Voltage VG is applied to a current generator comprising components Q4, R6, R7, R8, R9, all resistors having the same value R.

Current equation in the negative feedback loop of the current generator is:

$$VG - VH/R = VH - VT/R.$$

Current equation in the positive feedback loop of the current generator is, if i designates the current flowing through the line *m:*

$$VC - VT/R = -i - VC/R.$$

Combining those two equations, it results: $i = -VG/R$, because $VH = VC$.

The current *i* flowing from the generator into the line *m* is thus independent of the resistance of this line and is directly proportional to the voltage delivered by the amplifier Q3. As $VG = VL2$ (equation 3), one has:

$$VL2 = Ri \quad (4).$$

That equation (4) is identical to the equation (1) concerning the transmission direction N.

Thus it appears that, if wires *m* and *n* are respectively connected to wires n and m of another identical hybrid circuit, data are transmitted in a bidirectional manner between the two lines without any insertion loss.

Besides, it will be noted that no DC bias current is needed on wires *m* and *n*. Indeed The amplifiers Q1 and Q4 are supplied with respect to ground by equal voltages of opposite polarities so that, when there is no data signals applied thereto, wires *m* and *n* are at the ground potential;

Resistors R*ds* symbolize transistors of the MOS type which, are, not only, perfectly symmetric, but also permanently on provided that, for type-N transistors, their gates be biased by a voltage more positive than the most positive voltage existing on the drain electrode or on the source electrode.

Interactions from one transmission direction to the other one will now be considered.

1. REFLECTION, TOWARD DIRECTION M, OF SIGNALS TRANSMITTED IN DIRECTION N

From diagram of the FIG. 3, it appears that signals transmitted in direction N and appearing at points A' and B' are not only applied to the line of impedance RL, but also to the circuits comprising the amplifier Q3 which transmits signals in direction M. Signals $V1 = -Ri/2$ and $V2 = +Ri/2$ applied to A' and B' respectively, appear as belonging to the transmission direction M. However a voltage $V3 = -Ri$ is applied, via resistor R3, to the non-inverting input of amplifier Q3 in such a manner that, according to equation (2), $VG = 0$, so that no current flows through the wire m.

Thus it appears that a current flowing in wire n and causing a potential variation at point E can produce no current in wire m.

It will be noted that the current derived by resistors R1, R2 and R3 of value R' is negligible with respect to that sent to the load of value RL.

2. REFLECTION, TOWARD DIRECTION N, OF THE SIGNALS TRANSMITTED IN DIRECTION M

The voltage VL2 appearing across points A', B' is applied, on the one hand, to circuits including amplifier Q3 and, on the other hand, to point E.

As it has been previously mentioned, points E and F are at ground potential when no signal is received in direction N. The current flowing in wire *m* cannot thus produce any current in the wire *n*.

While the present invention has been hereabove described in relation with specific embodiment, it must be understood that the said description has only been made by way of example and does not limit the scope of this invention.

We claim:

1. An electronic two-wire to four-wire conversion circuit comprising a pair of input terminals connected to a balanced subscriber's line which provides a first variable voltage for data transmission in a first direction and which receives a second variable voltage for data transmission in the reverse direction, a receive terminal pair connected via first transmission means to said input terminals to transmit data signals toward the reverse direction, said first transmission means including first and second operational amplifiers connected to the receive terminal pair and to each other to convert unbalanced data signals applied to the receive terminal pair into balanced signals appearing across the input terminals, a transmit terminal pair connected via second transmission means to said input terminals to transmit data signals toward the first direction, said second transmission means including a differential amplifier connected across the pair of input terminals and connected in series with a current generator having an output connected to the transmit terminal pair, said second transmission means converting balanced input signals into unbalanced signals, and third means coupled between the output of the first operational amplifier and the non-inverting input of the differential amplifier for preventing signal reflections from the reverse direction to the first direction.

2. A circuit as claimed in claim 1, in which the means for preventing signal reflections from the reverse direction to the first direction includes a resistor coupled directly between the output of the first operational amplifier and the non-inverting input of the differential amplifier to null any reflection of the signals transmitted in the reverse direction toward the first direction.

3. A circuit as claimed in claim 1, in which the pair of input terminals are connected via capacitors to the first and second transmission means to enable a DC voltage to be applied to the subscriber's line and to isolate said first and second means from said DC voltage.

4. A circuit as claimed in claim 1, in which the first operational amplifier converts incoming data current appearing on the receive terminal pair into an output voltage at the output terminal of the first operational amplifier in phase opposition with said incoming data current, the second operational amplifier is coupled as a voltage inverter to said output terminal to deliver at its output terminal a voltage in phase opposition with respect to its input voltage, whereby voltages at the output terminals of said first and second operational amplifiers are of equal amplitude and in phase opposition, and means coupling said output terminals respectively to the pair of input terminals to enable the completion of transmission in the reverse direction.

5. A circuit as claimed in claim 1, in which the pair of input terminals are connected via capacitors through corresponding terminals to the first and second transmission means, the differential amplifier includes input terminals coupled through resistors of equal value to the corresponding terminals to provide an unbalanced output at an output terminal, the current generator is an operational amplifier having an inverting input coupled to the output terminal of the differential amplifier and a non-inverting input connected to the transmit terminal pair, whereby the current generator delivers data current via the transmit terminal pair to a switching network.

6. A circuit as claimed in claim 5, in which an additional resistor is coupled between the output of the first operational amplifier and the inverting input of the differential amplifier to avoid reflection of signals transmitted in the reverse direction toward the first direction.

7. A circuit as claimed in claim 1, in which the current generator includes a differential amplifier, the differential amplifier includes a negative feedback network coupling its output and its inverting input terminal, and the differential amplifier includes a positive feedback network coupling its output and its non-inverting feedback network.

8. A circuit as claimed in claim 7, in which a load resistance is coupled to the non-inverting input of said differential amplifier, and the value of the current supplied to said load resistance is a function of the input voltage and input resistance to the differential amplifier and independent of the value of the load resistance.

* * * * *